(12) United States Patent
Patel

(10) Patent No.: US 9,145,866 B1
(45) Date of Patent: Sep. 29, 2015

(54) ENERGY CONVERSION SYSTEM FOR OCEAN SURFACE WAVES

(71) Applicant: Rohan Patel, Bensalem, PA (US)

(72) Inventor: Rohan Patel, Bensalem, PA (US)

( * ) Notice: Subject to any disclaimer, the term of this patent is extended or adjusted under 35 U.S.C. 154(b) by 0 days.

(21) Appl. No.: 14/639,879

(22) Filed: Mar. 5, 2015

Related U.S. Application Data

(63) Continuation-in-part of application No. 14/303,569, filed on Jun. 12, 2014.

(60) Provisional application No. 61/988,037, filed on May 2, 2014, provisional application No. 61/973,796, filed on Apr. 1, 2014.

(51) Int. Cl.
*F03B 13/18* (2006.01)

(52) U.S. Cl.
CPC .................................. *F03B 13/1885* (2013.01)

(58) Field of Classification Search
CPC ...................................................... Y02E 10/38
USPC ........ 290/42, 53; 60/495, 496, 498, 501, 502, 60/504; 417/331, 332, 333
See application file for complete search history.

(56) References Cited

U.S. PATENT DOCUMENTS

| | | | | |
|---|---|---|---|---|
| 822,067 | A * | 5/1906 | Mowen | 60/716 |
| 1,790,058 | A * | 1/1931 | Morse | 60/504 |
| 4,196,591 | A * | 4/1980 | Wallace | 60/497 |
| 4,242,593 | A * | 12/1980 | Quilico et al. | 290/53 |
| 4,319,454 | A * | 3/1982 | Lucia | 60/506 |
| 4,480,966 | A * | 11/1984 | Smith | 417/332 |
| 2008/0272600 | A1* | 11/2008 | Olson | 290/53 |
| 2012/0000193 | A1* | 1/2012 | Kingston | 60/500 |
| 2012/0013127 | A1* | 1/2012 | Shpinev | 290/53 |
| 2012/0306210 | A1* | 12/2012 | Wen | 290/53 |
| 2013/0127168 | A1* | 5/2013 | Dragic | 290/53 |

* cited by examiner

*Primary Examiner* — Tulsidas C Patel
*Assistant Examiner* — Sean Gugger
(74) *Attorney, Agent, or Firm* — Raj Abhyanker, P.C.

(57) ABSTRACT

An energy conversion system is an apparatus used to collect the kinetic energy of incoming ocean waves and to covert that kinetic energy into electrical energy. The apparatus includes a buoyant platform and a plurality of wave-energy capturing (WEC) units. The buoyant platform stays afloat upon the ocean surface. The WEC units are peripherally distributed about the buoyant platform, which allows the apparatus to collect to the kinetic energy from incoming ocean waves from any direction. Each WEC unit includes a cam mechanism, a recoiling mechanism, a cable, an anchor, a pinion, a transmission, and a generator. The cam mechanism converts the linear motion of the buoyant platform into rotational motion, which is fed into the pinion, through the transmission, and into the generator. The recoiling mechanism returns the cam mechanism to its equilibrium position. Each WEC unit is secured to the seabed through the anchor and the cable.

38 Claims, 17 Drawing Sheets

ENERGY CONVERSION SYSTEM FOR OCEAN SURFACE WAVES

The current application claims priority to a provisional application 61/988,037 filed on May 2, 2014.

The current application is a continuation-in-part and claims priority to a non-provisional application Ser. No. 14/303,569 filed on Dec. 3, 2014. The non-provisional application Ser. No. 14/303,569 claims priority to a provisional application 61/973,796 filed on Apr. 1, 2014.

FIELD OF THE INVENTION

The present invention relates generally to renewable energy and green energy systems. More specifically, the present invention is a renewable energy system based on ocean surface waves.

BACKGROUND OF THE INVENTION

Renewable energy systems involve the use of resources that are continuously replenished such as sunlight, wind, rain, oceanic tides and waves, and geothermal heat. Renewable energy systems are favorable due to their ability to provide sustainable energy with largely reduced impact on the environment. The reduced environmental impact of renewable energy systems is particularly favorable relative to electricity generation from burning fossil fuel sources such as petroleum, coal, and natural gas. Fossil fuels yield a significantly high amount of energy relative to units burned. However, this benefit comes at the cost of increased greenhouse gas emissions into the atmosphere from the combustion of fossil fuels. Additionally, because fossil fuels generally form over millions of years, they are considered a non-renewable source of energy. Perhaps the most prominent consequence of greenhouse gas emissions is the progressive increase in the temperature of the Earth's atmosphere and oceans. Increased greenhouse gas emissions along with factors such as deforestation have led to warming of the Earth's climate system. The problem is projected to worsen in the future as the Earth's population increases, leading to a corresponding increase in energy demand and consumption. The consequences of the Earth's increasing temperature are perhaps most visible in the gradual decline of the Arctic sea ice over the years. The melting of the polar icecap has resulted in a rising of the sea level as well. Numerous ecosystems of the Earth negatively affected by rising temperatures and increased atmospheric $CO_2$ concentrations. Renewable energy systems greatly reduce the impact on the Earth's environment. However, despite technological advancements in renewable energy systems in recent years, renewable energy systems remain underutilized. Renewable energy systems hold a relatively low percentage share relative to conventional (fossil fuel) energy systems.

Therefore, an objective of the present invention is to provide a renewable energy system based on ocean surface waves, which are a readily available energy source. Another objective of the present invention is to provide a renewable energy system without having a negative environmental impact.

DETAILED DESCRIPTION OF THE INVENTION

Figure 1:
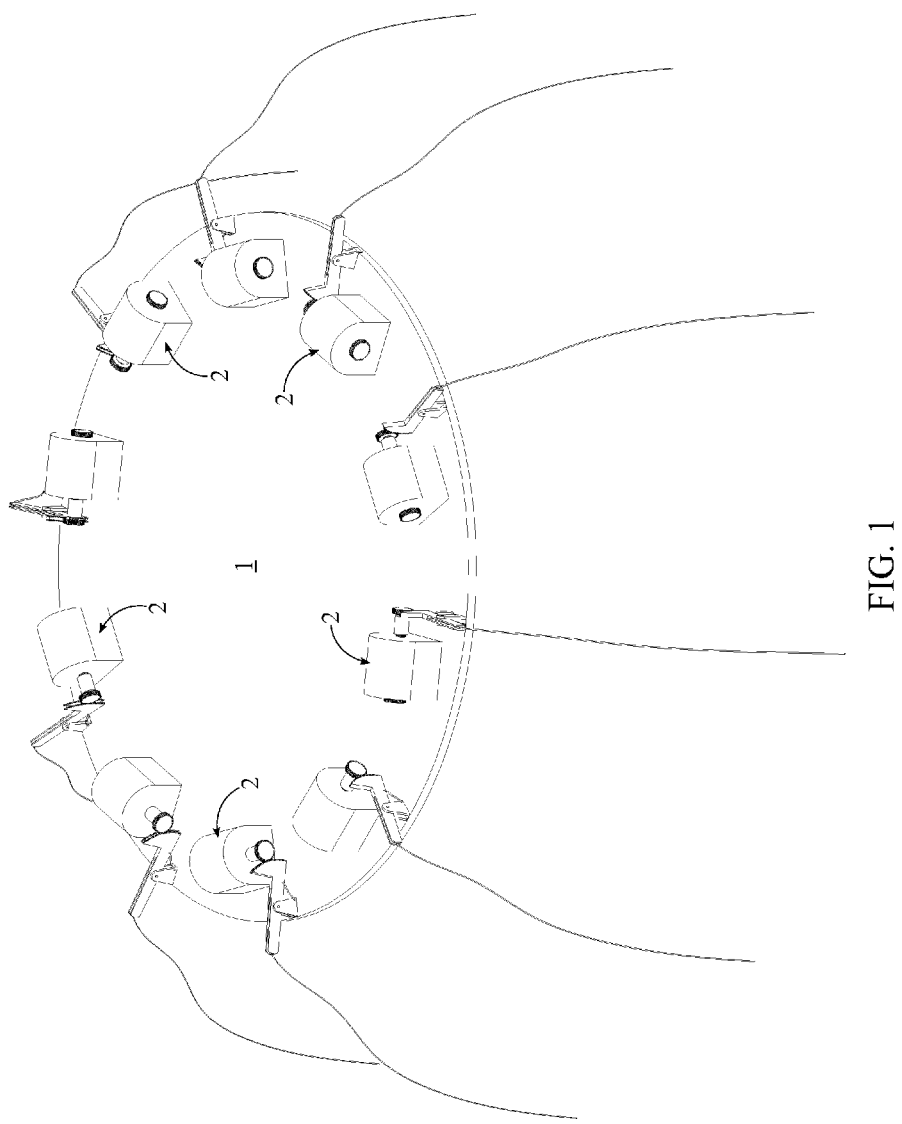
FIG. 1 is a perspective view of the present invention, wherein the buoyant platform has a circular disk shape.
Figure 2:
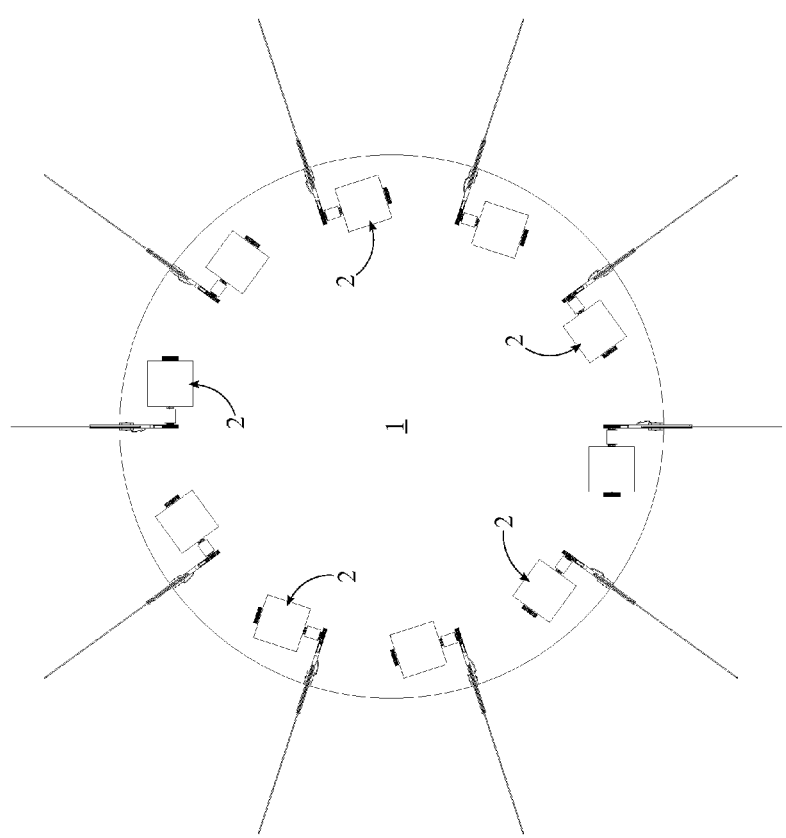
FIG. 2 is a top view of the present invention, wherein the buoyant platform has a circular disk shape.
Figure 3:
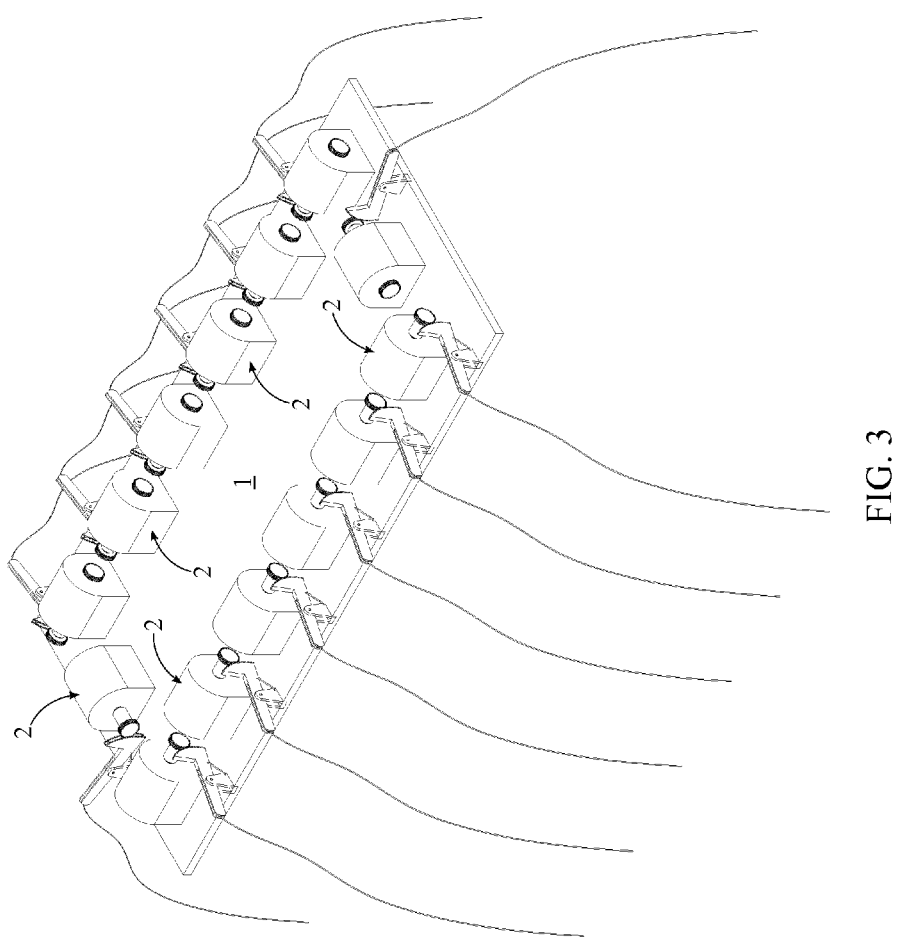
FIG. 3 is a perspective view of the present invention, wherein the buoyant platform has a rectangular shape.
Figure 4:
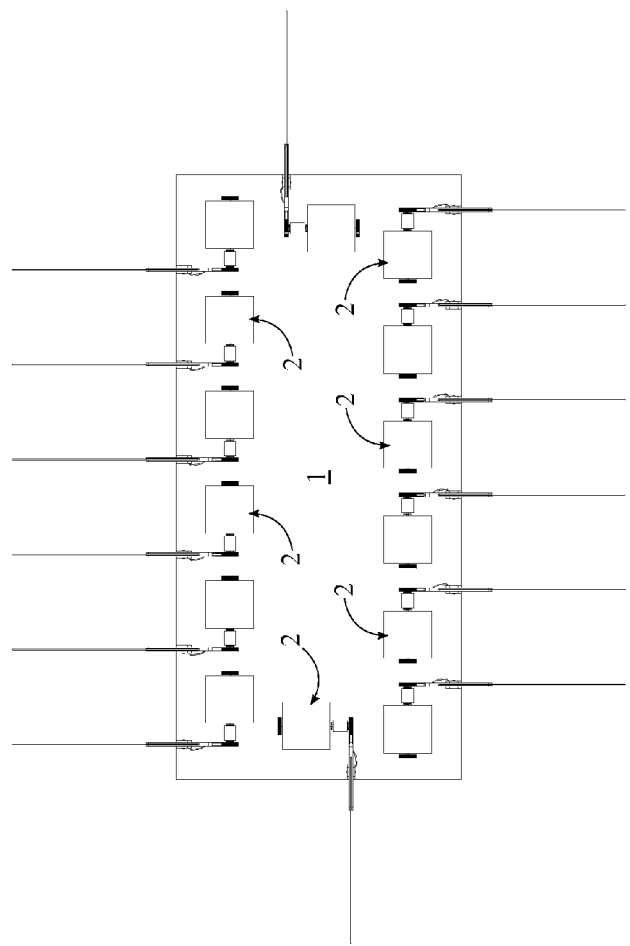
FIG. 4 is a top view of the present invention, wherein the buoyant platform has a rectangular shape.

All illustrations of the drawings are for the purpose of describing selected versions of the present invention and are not intended to limit the scope of the present invention.

As can be seen FIG. 1 through 4, the present invention is an energy conversion system for ocean surface waves that is used to convert the kinetic energy of ocean surface waves into electrical energy. The present invention is designed to be a free-floating, offshore structure that is installed in an area of the ocean where the present invention can be anchored to the seabed 45. The present invention comprises a buoyant platform 1 and a plurality of wave-energy capturing (WEC) units 2. The buoyant platform 1 serves as a base to situate the plurality of WEC units 2 above the ocean surface. The buoyant platform 1 must be physically configured to stay afloat the ocean surface despite the continuous downward weight being applied by the plurality of WEC units 2. Each of the plurality of WEC units 2 is anchored to the seabed 45 illustrated in FIG. 5 and is used to receive the linear motion of an incoming ocean wave, then converts that linear motion into rotational motion, and finally generates electrical energy from that rotational motion. The linear motion of the buoyant platform 1 can be created in a variety of different ways: incoming ocean waves can move the buoyant platform 1 in a horizontal direction, incoming ocean waves can move the buoyant platform 1 in a vertical direction; and incoming ocean waves can sway the buoyant platform 1 back and forth in an oscillatory manner. In addition, the plurality of WEC units 2 is peripherally distributed about the buoyant platform 1 so that the plurality of WEC units 2 can receive the linear motion of an incoming ocean wave from any direction.

As can be seen in FIG. 6 through 9, each of the plurality of WEC units 2 is an independent series of components that are mechanically coupled to each other in order to convert the linear motion of an incoming ocean wave into electrical energy. Thus, each of the plurality of WEC units 2 comprises a cam mechanism 3, a recoiling mechanism 100, a cable 15, an anchor 16, a pinion 17, a transmission 18, a rotational energy storage mechanism 21, and a generator 33. For each WEC unit, the cam mechanism 3 is actuated by the linear motion of the buoyant platform 1 and then converts this linear motion of the buoyant platform 1 into rotational motion. In order for the cam mechanism 3 to receive the linear motion from the buoyant platform 1, the cam mechanism 3 needs to be mounted on buoyant platform 1. The cam mechanism 3 is also tethered to the anchor 16 by the cable 15, and the anchor 16 is lodged into the seabed 45 in order to fix the position of the cam mechanism 3 in relation to the seabed 45. In some embodiments of the present invention, a chain, a belt, or another rope-like component may be used instead of the cable 15. In situations where the seabed 45 located under the buoyant platform 1 is uneven, the length of the cable 15 for each of the plurality of WEC units 2 is different in order to evenly situate the buoyant platform 1 across the ocean surface. The recoiling mechanism 100 is operatively coupled to the cam mechanism 3 so that the recoiling mechanism 100 is able to recoil the cam mechanism 3 to its equilibrium position after the cam mechanism 3 is actuated by the linear motion of the buoyant platform 1. Consequently the recoiling mechanism 100 primes the cam mechanism 3 to collect the kinetic energy of the next incoming ocean wave.

The cam mechanism 3 is essentially cranked by each incoming ocean wave and requires the pinion 17 and the transmission 18 to properly rotate the generator 33. Therefore, the cam mechanism 3 is operatively engaged to the pinion 17, which converts the linear motion of the buoyant platform 1 into rotational motion that can be inputted into the generator 33. The pinion 17 is then torsionally connected into the transmission 18, which properly ratios the rotational motion that is being fed into the generator 33. Thus, the transmission 18 needs to be torsionally connected into the generator 33 so that the generator 33 is finally able to convert the kinetic energy collected from the incoming ocean wave into electrical energy.

Figure 6:
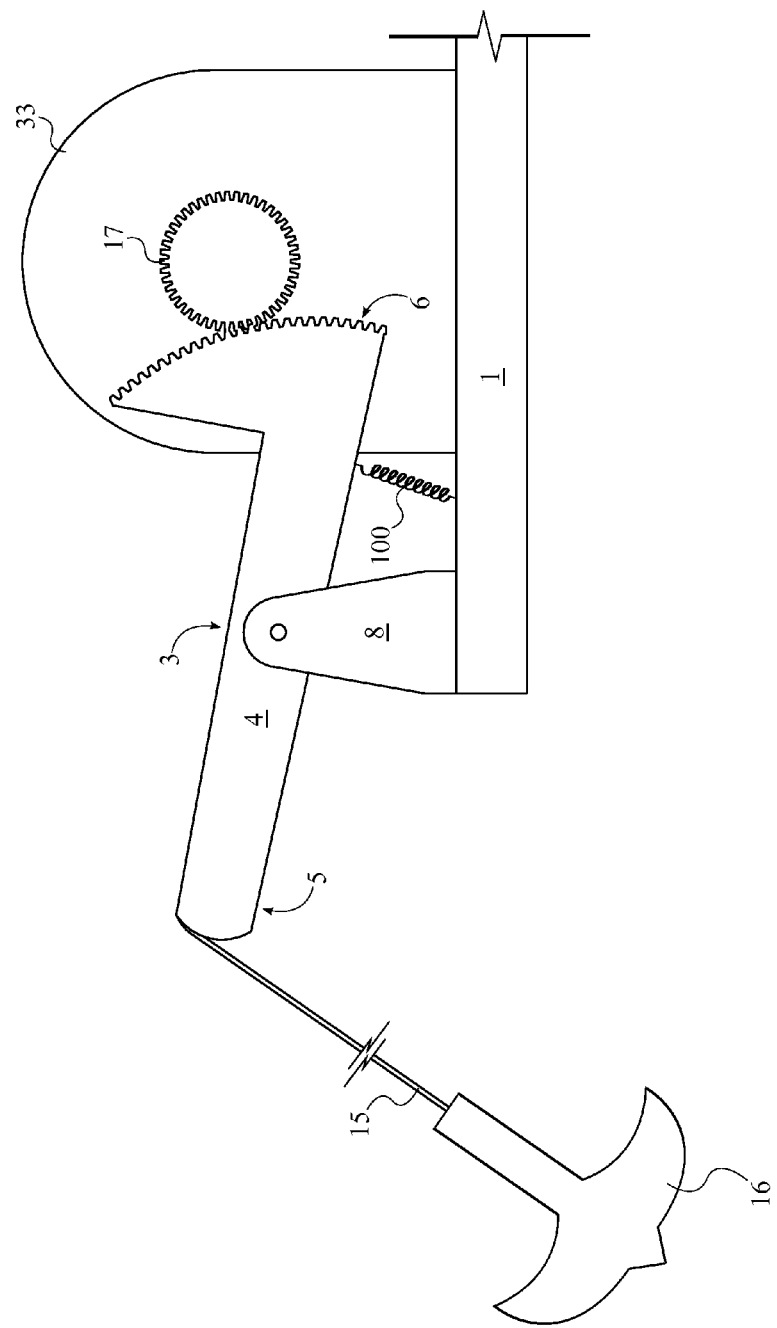
FIG. 6 is a schematic side view of the first configuration of the cam mechanism for the present invention.
Figure 7:
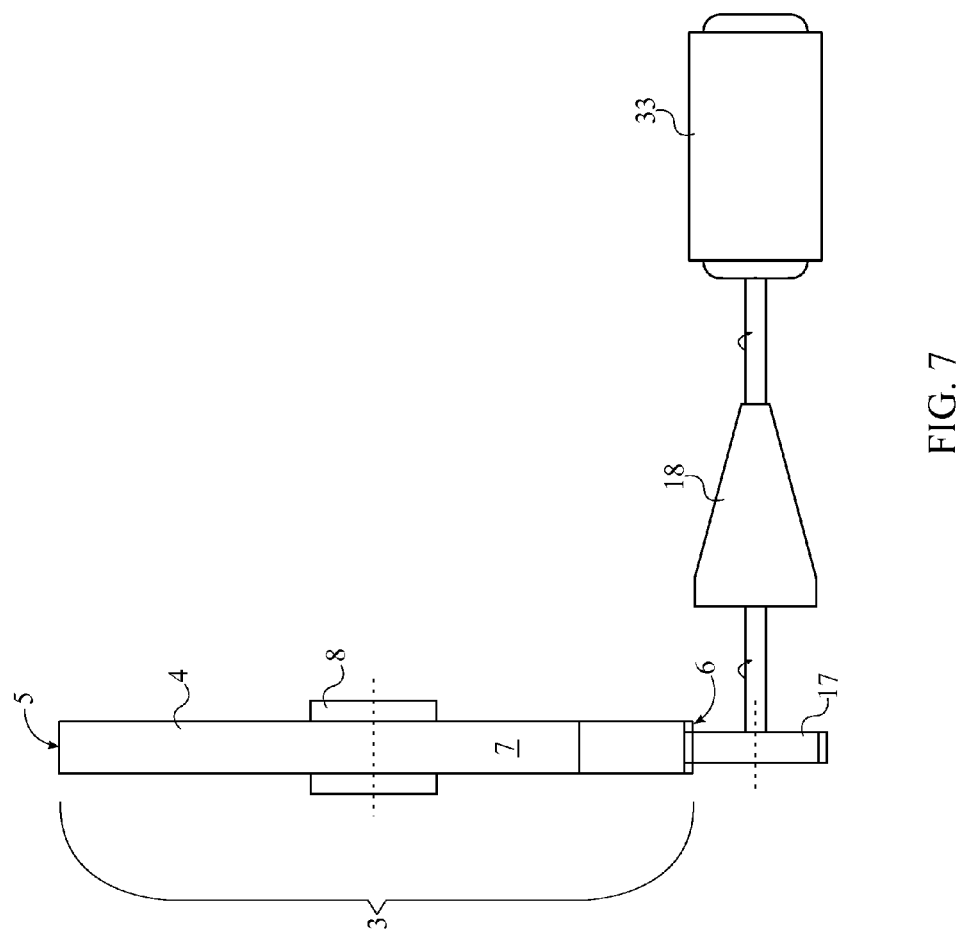
FIG. 7 is a schematic top view of the first configuration of the cam mechanism for the present invention.

The cam mechanism 3 can be designed in two different configurations. The first configuration of the cam mechanism 3 comprises a lever arm 4 and a fulcrum 8, which are shown in FIGS. 6 and 7. The fulcrum 8 is connected onto to the buoyant platform 1 and allows the lever arm 4 to pivot about a fixed point as the buoyant platform 1 is moved by incoming ocean waves. The lever arm 4 has a protruding end 5 and a racked gear end 6. The protruding end 5 overhangs from the perimeter of the buoyant platform 1 so that the anchor 16 can be tethered to the protruding end 5 by the cable 15. The lever arm 4 is pivotally mounted to the fulcrum 8 between the protruding end 5 and the racked gear end 6 so that the protruding end 5 leverages the racked gear end 6 upwards when an ocean wave travels past the buoyant platform 1. The recoiling mechanism 100 for the first configuration is a tension spring that is operatively coupled to the lever arm 4, adjacent to the racked gear end 6, in order to recoil the racked gear end 6 towards the buoyant platform 1. Thus, the tension spring returns the lever arm 4 to its equilibrium position so that the lever arm 4 is primed to collect the kinetic energy of the next incoming ocean wave. Finally, the racked gear end 6 is engaged to the pinion 17 forming a rack-and-pinion gear connection, which allows the cam mechanism 3 to drive the pinion 17 with rotational motion.

Figure 8:
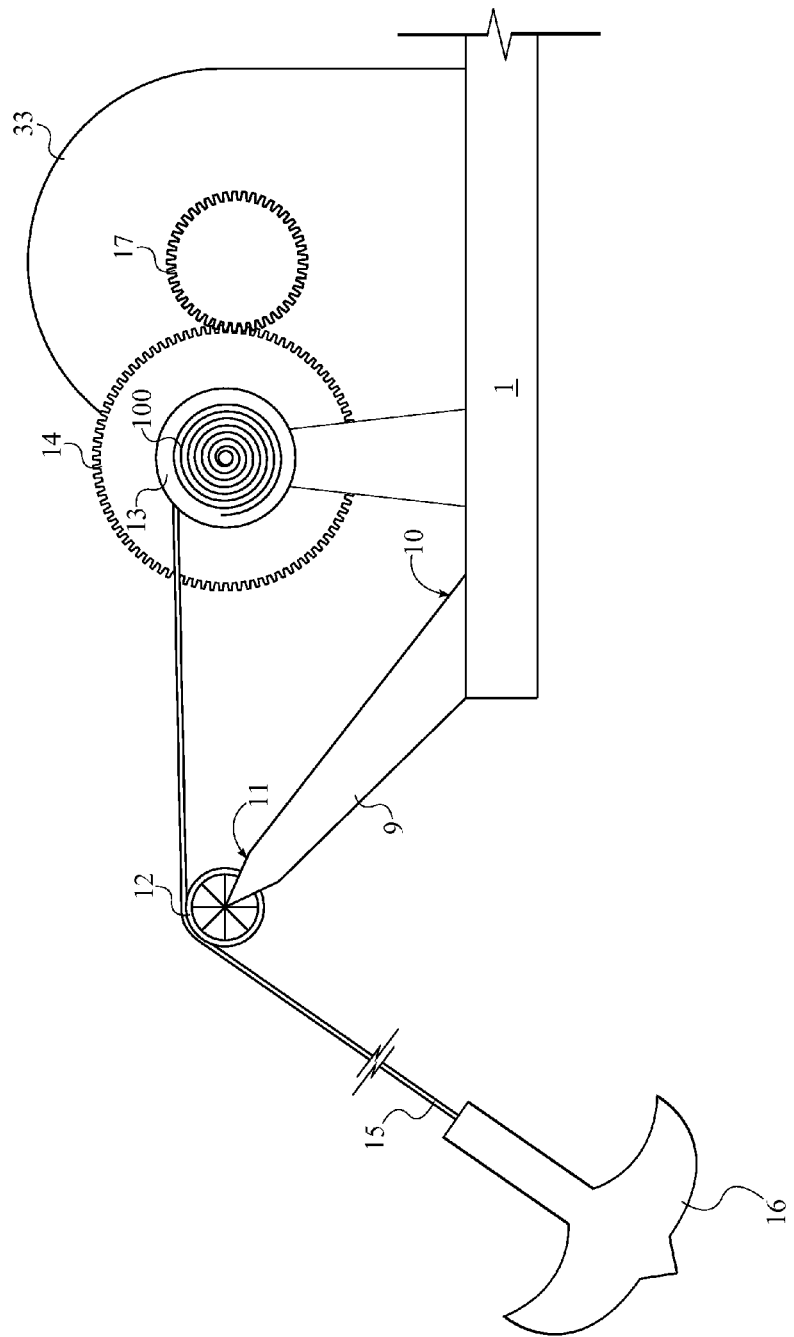
FIG. 8 is a schematic side view of the second configuration of the cam mechanism for the present invention.
Figure 9:
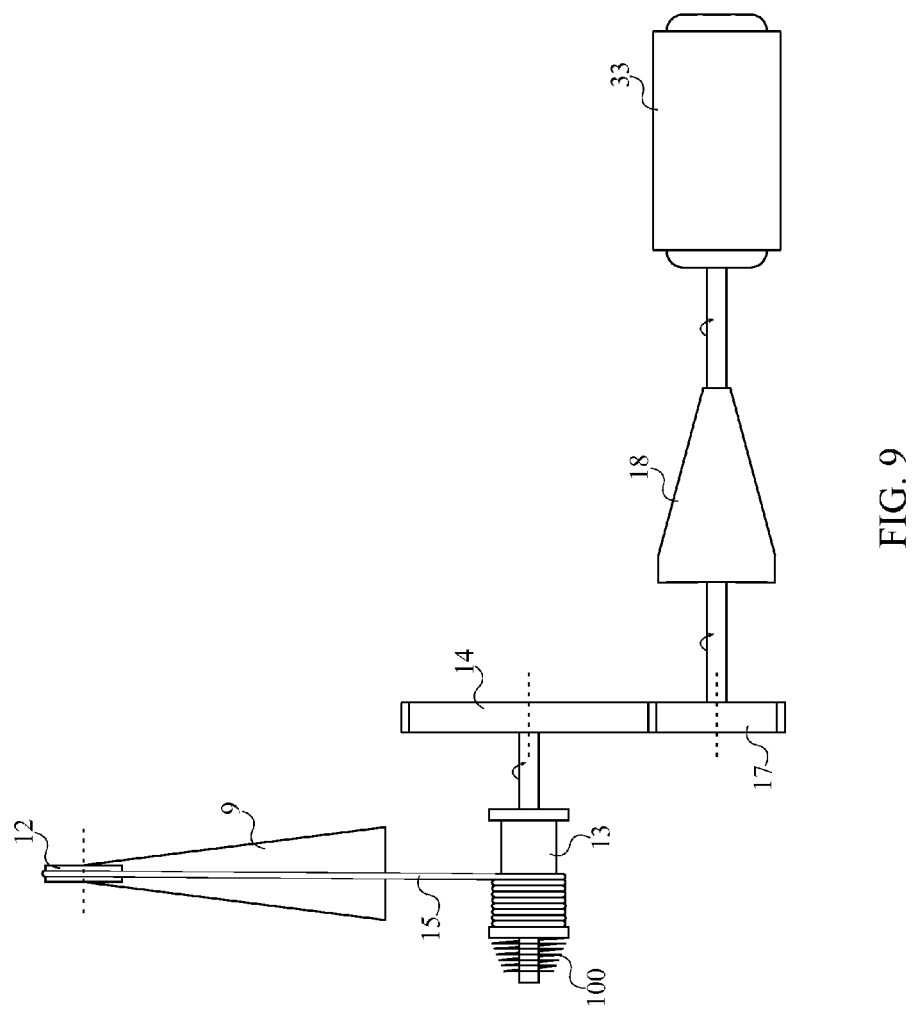
FIG. 9 is a schematic top view of the second configuration of the cam mechanism for the present invention.

The second configuration of the cam mechanism 3 comprises a boom 9, a pulley 12, a spool 13, and a drive gear 14, which are shown in FIGS. 8 and 9. The boom 9 is an extension arm that is used to position the pulley 12 outside the perimeter of the buoyant platform 1. The boom 9 has an inner end 10 and an outer end 11. The pulley 12 is rotatably mounted to the outer end 11 so that the pulley 12 is able to receive the cable 15 as the cable 15 exits the ocean surface. The inner end 10 is mounted onto the buoyant platform 1, and the spool 13 is rotatably mounted onto the buoyant platform 1, adjacent to the inner end 10, which allows the cable 15 to traverse from the anchor 16, about the pulley 12, and to the spool 13. The cable 15 wraps around the spool 13 so that the spool 13 is able to ravel and unravel the cable 15 as the buoyant platform 1 is moved by incoming ocean waves. The recoiling mechanism 100 for the second configuration is a torsion spring that is axially connected to the spool 13, which allows the spool 13 to recoil to its angular equilibrium position once the cam mechanism 3 is cranked by the linear motion of the buoyant platform 1. The spool 13 is axially connected to the drive gear 14 so that the drive gear 14 rotates with the spool 13. Finally, the drive gear 14 is engaged to the pinion 17, which allows the cam mechanism 3 to provide the pinion 17 with rotation motion. The drive gear 14 and the pinion 17 are designed with the proper gear ratio in order to optimize the exchange of rotational motion from the drive gear 14 to the pinion 17.

Figure 10:
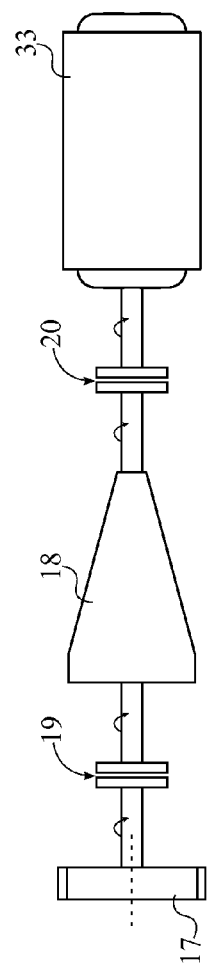
FIG. 10 is a schematic top view of the first one-way clutch and the second one-way clutch integrated into the drive train.

The drive train formed by the pinion 17, the transmission 18, and the generator 33 is only capable of converting kinetic energy into electrical energy if these components are all rotating in the same direction. Thus, each of the plurality of WEC units 2 should further comprise a first one-way clutch 19 and a second one-way clutch 20, which are shown in FIG. 10. The first one-way clutch 19 is torsionally integrated between the pinion 17 and the transmission 18, which prevents the pinion 17 from rotating the transmission 18 in the opposite direction when the recoiling mechanism 100 returns the cam mechanism 3 to its equilibrium position. The second one-way clutch 20 is torsionally integrated between the transmission 18 and the generator 33, which similarly prevents the transmission 18 from rotating the generator 33 in the opposite direction. The first one-way clutch 19 and the second one-way clutch 20 provide the additional benefit of preventing the waste of energy by unnecessarily rotating components along drive train. In some embodiments of the present invention, the drive train only includes either the first one-way clutch 19 or the second one-way clutch 20, and, in some other embodiments, the drive train includes both the first one-way clutch 19 and the second one-way clutch 20.

Figure 11:
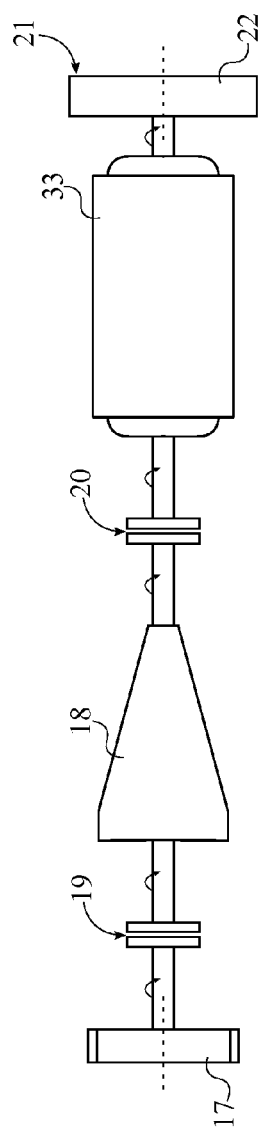
FIG. 11 is a schematic top view of the flywheel as the rotational energy storage mechanism integrated into the drive train.
Figure 12:
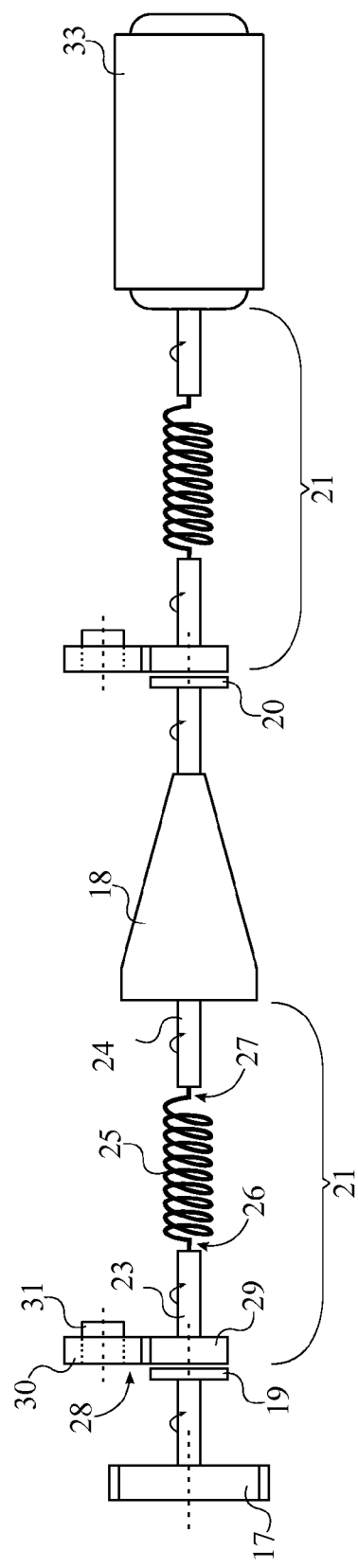
FIG. 12 is a schematic top view of the torsion spring system as the rotation energy storage mechanism integrated into the drive train.

The rotational energy storage mechanism 21 is used to provide the generator 33 with continuous rotational motion because the cam mechanism 3 is only able to crank the pinion 17 at distinct intervals. In one embodiment of the present invention illustrated in FIG. 11, the rotational energy storage mechanism 21 is a flywheel 22 that is torsionally connected to the generator 33, which allows the flywheel 22 to continuously drive the generator 33 in between each cranking interval. In another embodiment of the present invention illustrated in FIG. 12, the rotational energy storage mechanism 21 uses a series of mechanical components to provide the continuous rotational motion to the generator 33 in a torsional fashion. The rotational energy storage mechanism 21 comprises an input shaft 23, an output shaft 24, a drive spring 25, and a locking mechanism 28. The input shaft 23 is used to receive the rotational motion from each cranking interval and, thus, is torsionally fixed to the first end 26 of the drive spring 25. The drive spring 25 stores rotational energy by twisting during each cranking interval. The second end 27 of the drive spring 25 is torsionally fixed to the output shaft 24 so that the drive spring 25 is able to provide continuous rotational motion to the output shaft 24.

The locking mechanism 28 is required to prevent the input shaft 23 from rotating backwards after the input shaft 23 is rotated forward during each cranking interval. The locking mechanism 28 comprises a first gear 29, a second gear 30, and a one-way bearing 31. The first gear 29 is axially connected to the input shaft 23 so that the first gear 29 is rotated in a forward direction during each cranking interval. The second gear 30 is engaged to the first gear 29, which rotates the second gear 30 in a backward direction during each cranking interval. The second gear 30 is rotatably mounted onto the one-way bearing 31, which prevents the second gear 30 from rotating in the forward direction and consequently prevents the first gear 29 and the input shaft 23 from rotating in the backward direction.

In this embodiment of the present invention, the rotational energy storage mechanism 21 with the input shaft 23, the output shaft 24, the drive spring 25, and the locking mechanism 28 can be mechanically integrated into two different areas along the drive shaft. One area is between the pinion 17 and the transmission 18 so that the pinion 17 is torsionally connected to the input shaft 23 and so that the output shaft 24 is torsionally connected into the transmission 18. The other area is between the transmission 18 and the generator 33 so that the transmission 18 is torsionally connected to the input shaft 23 and so that the output shaft 24 is torsionally connected into the generator 33. The rotational energy storage mechanism 21 is this embodiment can be mechanically integrated into either of the aforementioned areas or one of the rotational energy storage mechanism 21 can be mechanically integrated into each of the aforementioned areas.

Figure 13:
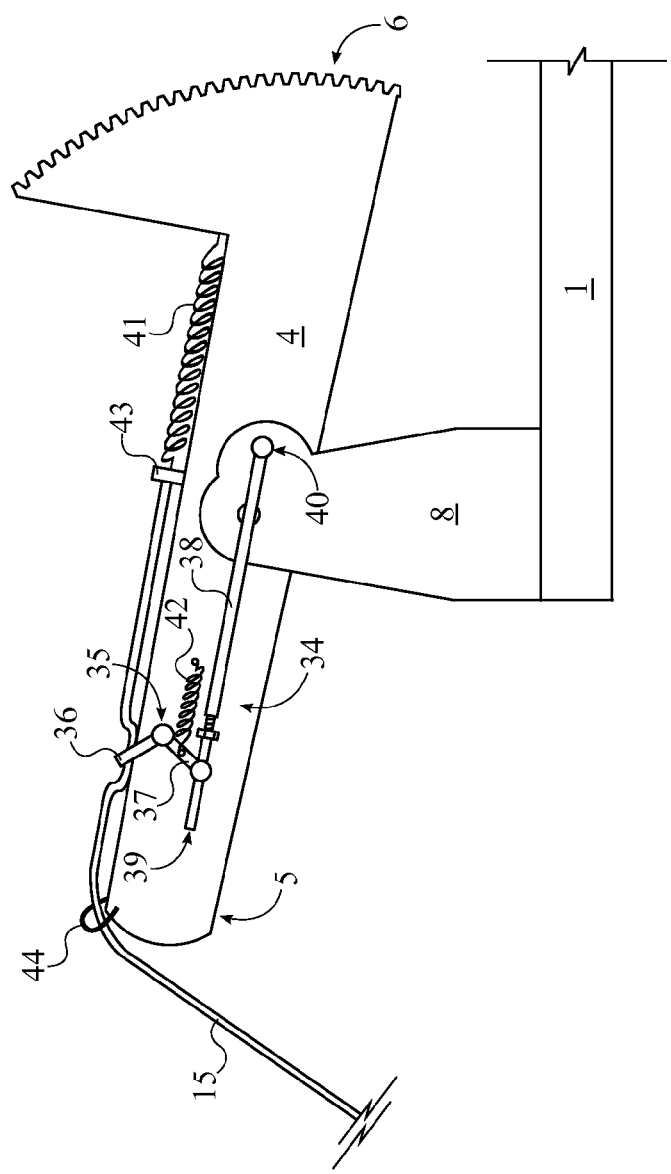
FIG. 13 is a schematic side view of the tension/slack generating mechanism clamping down on the cable.
Figure 14:
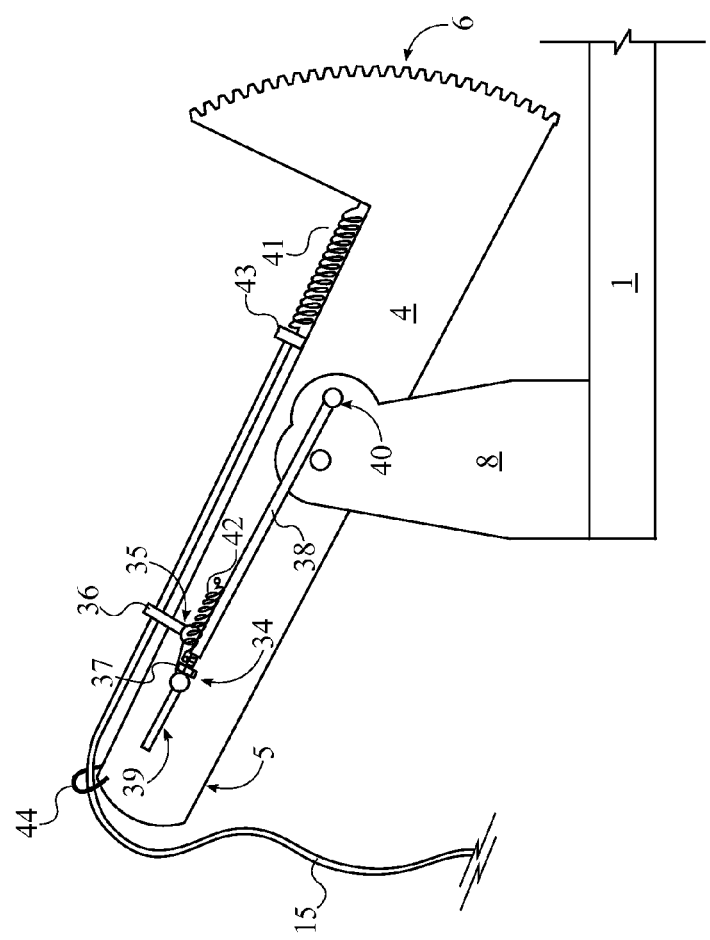
FIG. 14 is a schematic side view of the tension/slack generating mechanism releasing the cable, wherein the lever arm and the buoyant platform are at an inoperable angle range for the present invention.
Figure 15:
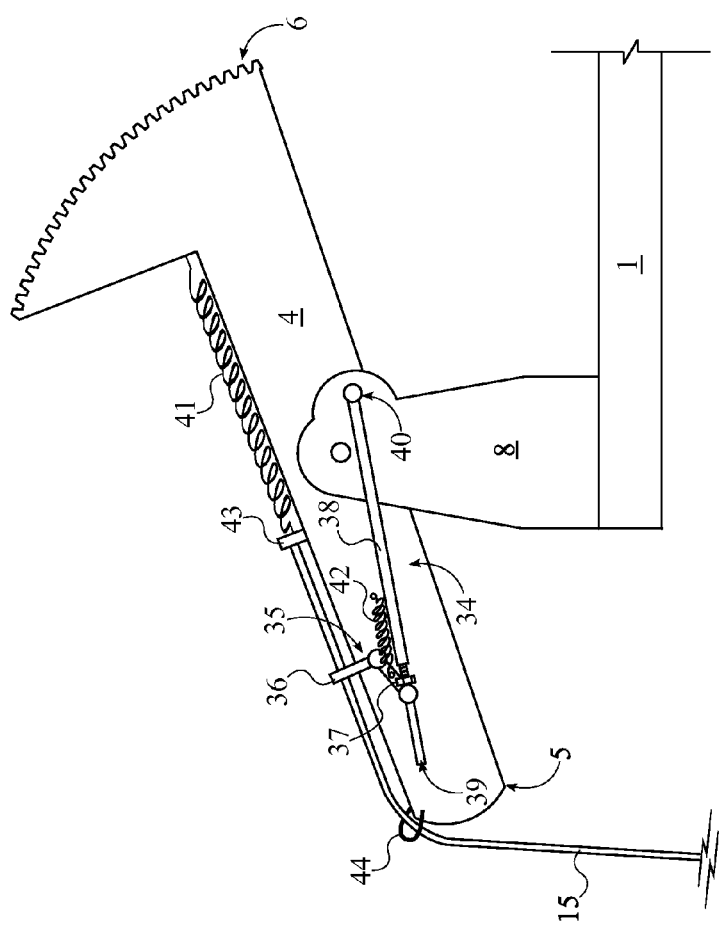
FIG. 15 is a schematic side view of the tension/slack generating mechanism releasing the cable, wherein the lever arm and the buoyant platform are at another inoperable angle range for the present invention.

Moreover, in the first configuration of the cam mechanism 3, each of the plurality of WEC units 2 further comprises a tension/slack generating mechanism 34 shown in FIG. 13 through 15, which allows the cable 15 to retract or extend when the water level beneath the buoyant platform 1 is raised so high or so low that the present invention becomes inoperable. The tension/slack generating mechanism 34 comprises a bracket 35, a connecting rod 38, a length adjusting spring 41, and a locking spring 42. The cable 15 for each of the plurality of WEC units 2 traverses about the protruding end 5 and along the top surface 7 of the lever arm 4 and is finally tethered to the lever arm 4 by the length adjusting spring 41, which retracts in order to tension the cable 15 when the water level is lower than normal (FIG. 14) and stretches out in order to provide the cable 15 with more slack when the water level is higher than normal (FIG. 15). The length adjusting spring 41 only becomes necessary when the present invention is inoperable because of an extreme increase or decrease in water level. Thus, the bracket 35 is used to secure the cable 15 in place when the ocean surface is at an operable water level for the present invention and is used to release the cable 15 when the ocean surface is at an inoperable water level for the present invention. The bracket 35 comprises a clamping end 36 and an actuation end 37. The clamping end 36 is positioned around the cable 15 and the top surface 7 of the lever arm 4 so that the clamping end 36 is readily available to clamp the cable 15 against the top surface 7. The bracket 35 is pivotally mounted to the lever arm 4 in between the clamping end 36 and the actuation end 37, which allows the clamping end 36 to pivot between a locked position and an unlocked position.

The connecting rod 38 is used to actuate the bracket 35 by the geometric relation of the connecting rod 38 between the lever arm 4 and the fulcrum 8. The connecting rod 38 comprises a railed end 39 and a fixed end 40. The railed end 39 is a narrow shaft at one end of the connecting rod 38, and the actuation end 37 is slidably engaged along the railed end 39 so that the actuation end 37. The fixed end 40 is the other end of the connecting rod 38 that the connection rod 38 rotates about, and, thus, the fixed end 40 needs to be pivotally connected to the fulcrum 8. The connections between aforementioned components are mechanically configured in such a way that only two situations can occur with the present invention. As can be seen in FIG. 13, the first situation is that the lever arm 4 and the buoyant platform 1 are oriented at an angle to each other that falls within the functional angle range for the present invention. In this situation, the locking spring 42 pulls on the actuation end 37, which allows the clamping end 36 to press the cable 15 against the top surface 7 of the lever arm 4, and, therefore, holds the cable 15 in place. Also in this situation, the railed end 39 is able to freely slide through actuation end 37 without disabling the clamping end 36. As can be seen in either FIG. 14 or FIG. 15, the second situation is that the lever arm 4 and the buoyant platform 1 are oriented at an angle to each other that falls within the nonfunctional angle range for the present invention, wherein the lever arm 4 and buoyant platform 1 are oriented at too large of an angle for the present invention to properly function (FIG. 14) or are oriented at too small of an angle for the present invention to properly function (FIG. 15). In this alternate situation, the actuation end 37 is pressed against a stop of the railed end 39 so that the actuation end 37 is pushed by the connecting rod 38 in the opposite direction that the locking spring 42 is pulling. Consequently, the bracket 35 is actuated in the opposite direction so that the clamping end 36 is offset from the cable 15 and the top surface 7 of the lever arm 4 and, therefore, allows the length adjusting spring 41 to stretch or to retract in order to provide the cable 15 with more slack or with more tension.

The present invention may encounter environment disasters that may be too severe to simply provide the cable 15 with more slack or tension. For example, if the water level rises to a height that was not predetermined when the present invention was being anchored into the seabed 45, then the present invention will need a failsafe to survive such disasters. Thus, each of the plurality of WEC units 2 further comprises a stopper 43 and a choke 44, which are also shown in FIG. 13 through 15. The stopper 43 is integrated along the cable 15, and the choke 44 is connected onto the cam mechanism 3 around the cable 15. In order for the stopper 43 and the choke 44 to be used as a failsafe, the choke 44 is positioned along the cable 15 in between the anchor 16 and the stopper 43. If the water level rises to extreme conditions, then the stopper 43 engages and locks into the choke 44 for each of the plurality of WEC units 2 so that the present invention is submerged under the ocean surface instead of experiencing structural failure.

Figure 16:
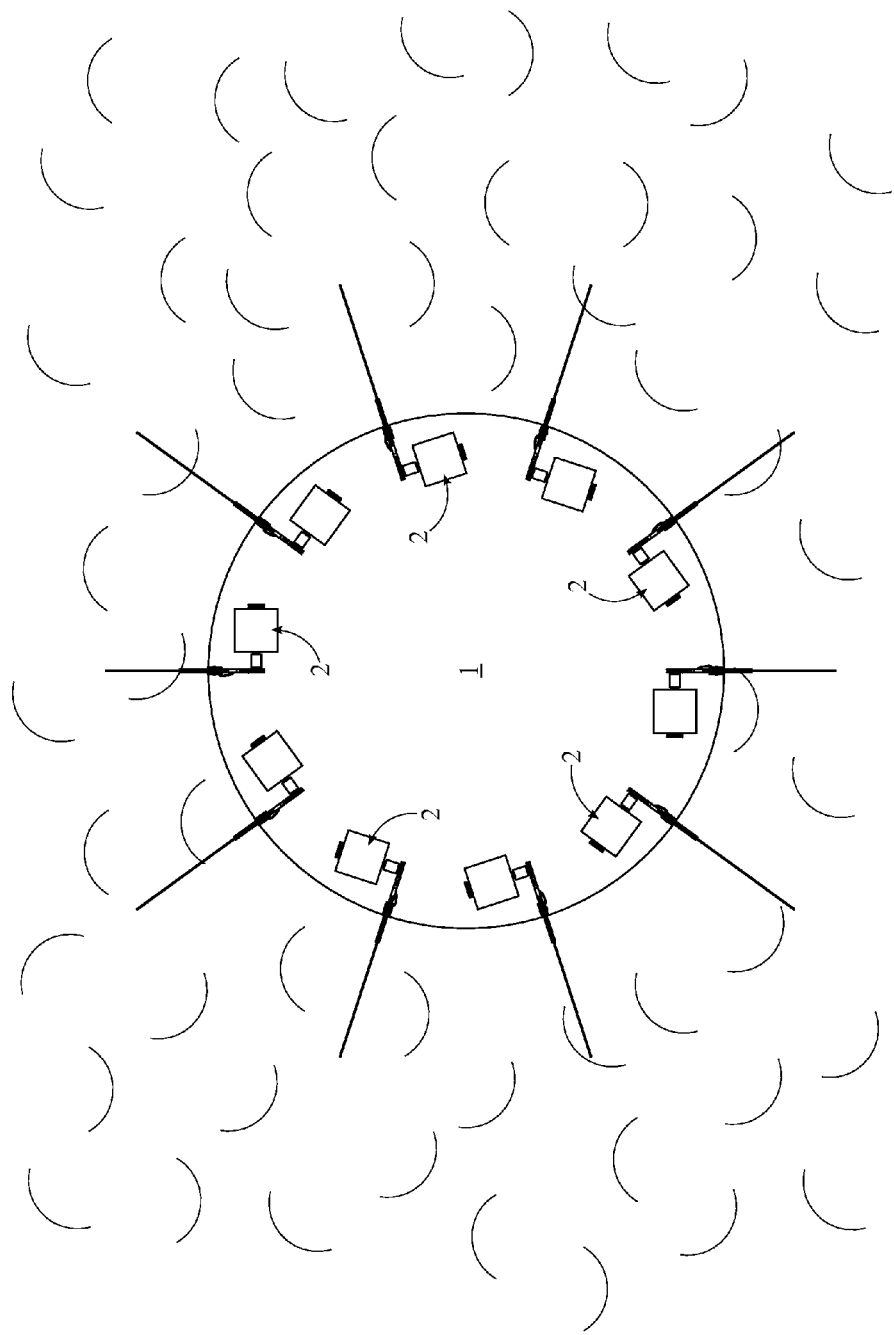
FIG. 16 is a top view of the present invention, wherein the buoyant platform has a circular disk shape and is amongst ocean waves travelling in random directions.
Figure 17:
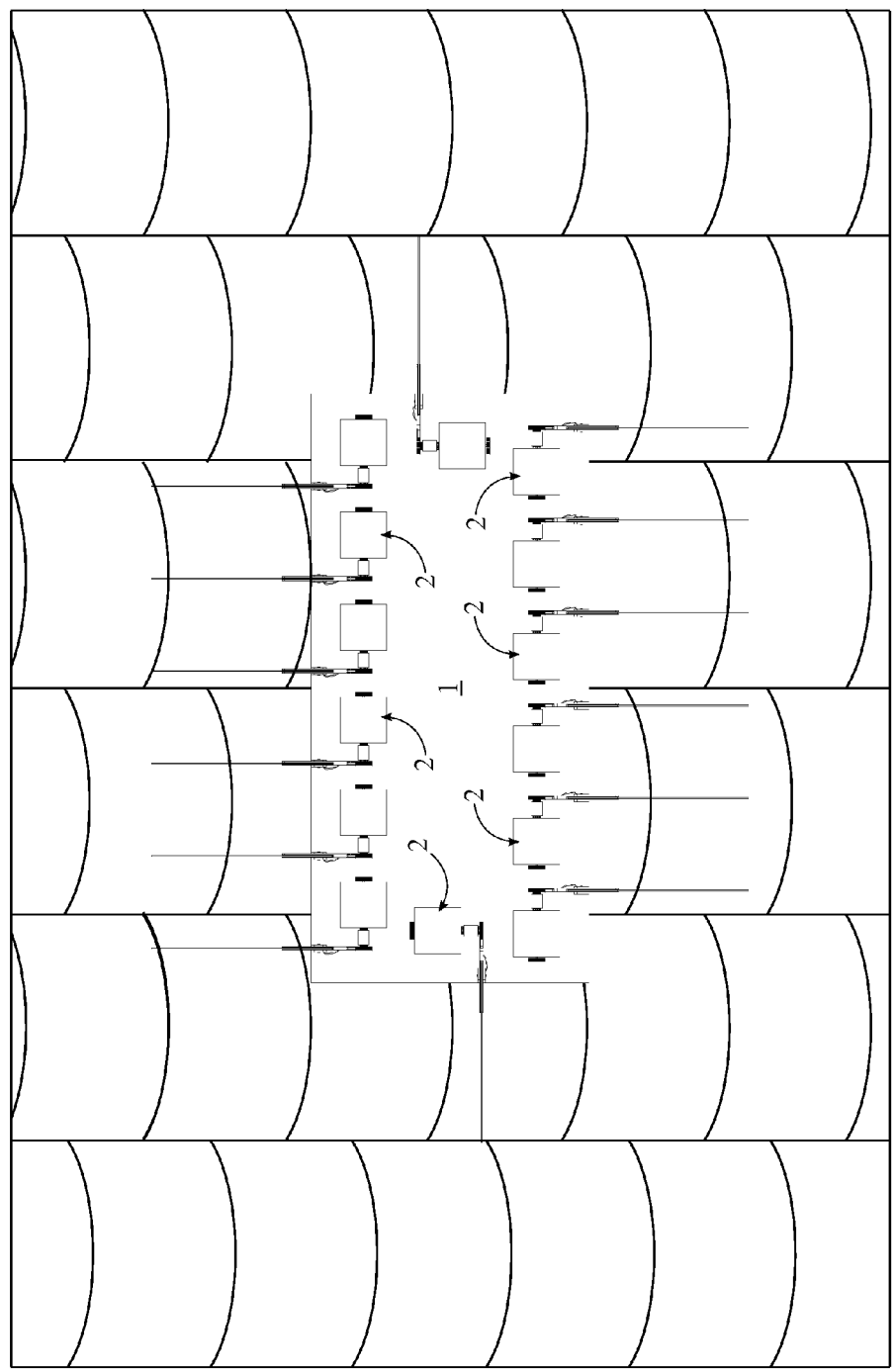
FIG. 17 is a top view of the present invention, wherein the buoyant platform has a rectangular shape is among ocean waves travelling in parallel.

The present invention can be situated in an area with either parallel rows of waves or randomly-oriented waves. In one embodiment of the present invention illustrated in FIG. 16, the buoyant platform 1 is a circular disk shape. Consequently, the lever arm 4 or the boom 9 for each of the plurality of WEC units 2 is radially positioned around the circular disk shape so that if the present invention is placed in an area with randomly-oriented waves, then the positioning of the plurality of WEC units 2 is able to receive the kinetic energy of those randomly-oriented waves from any random direction. In another embodiment of the present invention illustrated in FIG. 17, the buoyant platform 1 is a rectangular shape. Consequently, the lever arm 4 or the boom 9 for each of the plurality of WEC units 2 is perpendicularly oriented with its respective edge of the rectangular shape so that if the present invention is situated in an area with parallel rows of waves, then the positioning of the plurality of WEC units 2 is able to more efficiently receive the kinetic energy of those parallel rows of waves.

Figure 5:
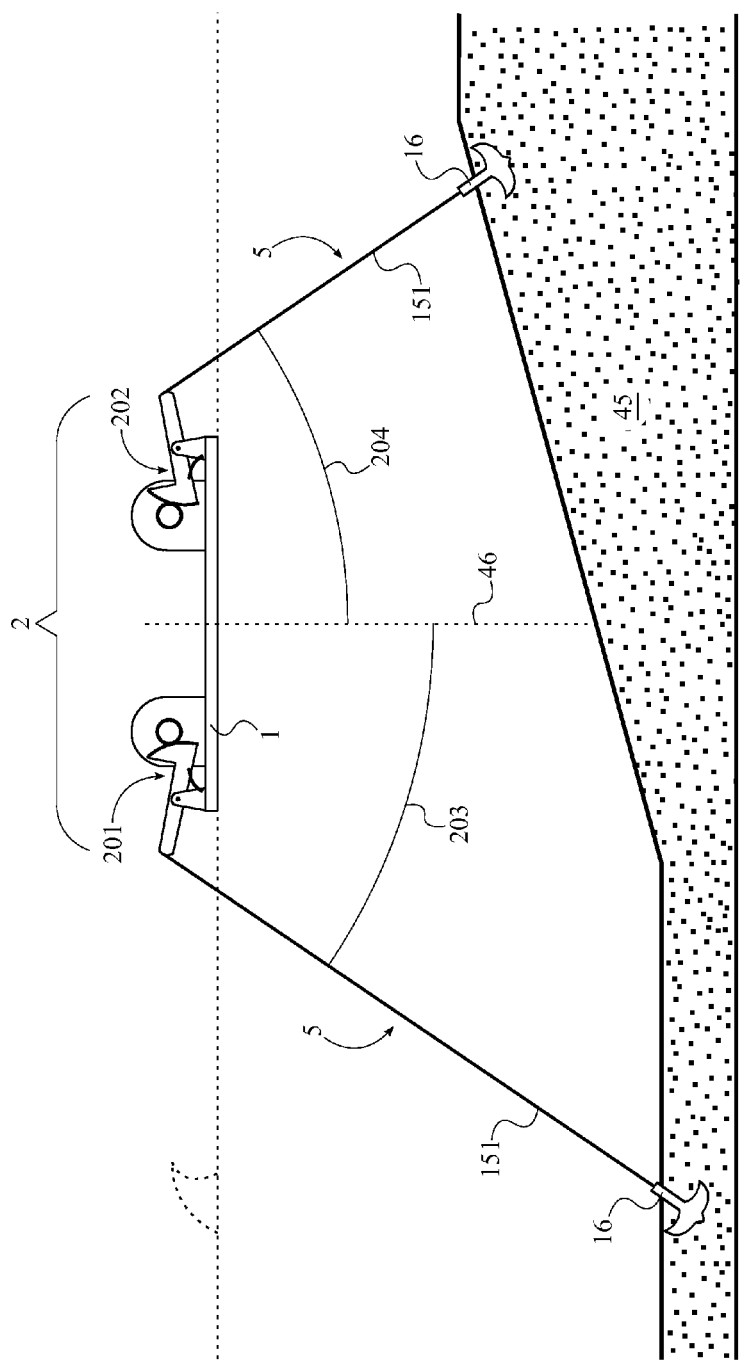
FIG. 5 is a schematic side view of the present invention anchored into the seabed.

As can be seen in FIG. 5, the plurality of WEC units 2 is oriented in a specific arrangement in order to keep the buoyant platform 1 normal to the vertical axis 46. In order to describe the specific arrangement, the plurality of WEC units 2 comprises an arbitrary unit 201 and a corresponding unit 202. The arbitrary unit 201 is any unit within the plurality of WEC units 2, and the corresponding unit 202 is the unit that is positioned opposite to the arbitrary unit 201 across the buoyant platform 1. The cable 15 for each of the plurality of WEC units 2 comprises a taught portion 151 that is located between the anchor 16 and the cam mechanism 3. In this specific arrangement, the taught portion 151 for the arbitrary unit 201 is at a first angle 203 with the vertical axis 46, and the taught portion 151 for the corresponding unit 202 is at a second angle 204 with the vertical axis 46. In order to keep the buoyant platform 1 normal to the vertical axis 46, the first angle 203 and the second angle 204 need to be equal to each other.

Although the invention has been explained in relation to its preferred embodiment, it is to be understood that many other possible modifications and variations can be made without departing from the spirit and scope of the invention as hereinafter claimed.

What is claimed is:

1. An energy conversion system for ocean surface waves comprises:
    a buoyant platform;
    a plurality of wave-energy capturing (WEC) units;
    each of said plurality of WEC units comprises a cam mechanism, a recoiling mechanism, a cable, an anchor, a pinion, a transmission, a rotational energy storage mechanism, a tension/slack generating mechanism and a generator;
    said plurality of WEC units being peripherally distributed about said buoyant platform;
    said cam mechanism being tethered to said anchor by said cable;
    said cam mechanism being mounted onto said buoyant platform, wherein the cam mechanism is actuated by linear motion of said buoyant platform;
    said recoiling mechanism being operatively coupled to said cam mechanism, wherein said recoiling mechanism recoils said cam mechanism after said cam mechanism is actuated by said linear motion of said buoyant platform;
    said cam mechanism being operatively engaged to said pinion, wherein said cam mechanism converts said linear motion of said buoyant platform into rotational motion in order to rotate said pinion;
    said pinion being torsionally connected into said transmission;
    said transmission being torsionally connected into said generator;
    said cam mechanism comprises a lever arm and a fulcrum;
    said recoiling mechanism being a tension spring;
    said lever arm comprises a protruding end and a racked gear end;
    said fulcrum being connected onto said buoyant platform;
    said lever arm being pivotally mounted to said fulcrum between said protruding end and said racked gear end;
    said tension spring being operatively coupled to said racked gear end, wherein said tension spring recoils said racked gear end towards said buoyant platform;
    said anchor being tethered to said protruding end by said cable;
    said racked gear end being engaged to said pinion;
    said tension/slack generating mechanism comprises a bracket, a connecting rod, a length adjusting spring, and a locking spring;
    said bracket comprises a clamping end and an actuation end;
    said cable traversing about said protruding end and along a top surface of said lever arm;
    said cable being tethered to said lever arm by said length adjusting spring;
    said clamping end being positioned around said cable and said top surface;
    said bracket being pivotally mounted to said lever arm in between said clamping end and said actuation end;
    said actuation end being tethered to said lever arm by said locking spring;
    said actuation end being slidably engaged along a railed end of said connecting rod; and
    a fixed end of said connecting rod being pivotally connected to said fulcrum.

2. The energy conversion system for ocean surface waves as claimed in claim 1 comprises:
    wherein said lever arm and said buoyant platform are oriented at a functional angle range between each other; and
    said cable being pressed against said top surface by said clamping end.

3. The energy conversion system for ocean surface waves as claimed in claim 1 wherein said clamping end being offset from said cable and said top surface.

4. The energy conversion system for ocean surface waves as claimed in claim 1 comprises:
    said cam mechanism comprises a boom, a pulley, a spool, and a drive gear;
    the recoiling mechanism being a torsion spring;
    said boom comprises an outer end and an inner end;
    said inner end being mounted onto said buoyant platform;
    said spool being rotatably mounted onto said buoyant platform, adjacent to said inner end;
    said pulley being rotatably mounted to said outer end;
    said cable traversing from said anchor, about said pulley, and to said spool;
    said spool being axially connected to said drive gear;
    said drive gear being engaged to said pinion; and
    said spool being axially connected to said torsion spring.

5. The energy conversion system for ocean surface waves as claimed in claim 1, wherein said anchor for each of said WEC units is lodged into a seabed.

6. The energy conversion system for ocean surface waves as claimed in claim 1, wherein said linear motion of said buoyant platform is created by incoming ocean waves that are moving said buoyant platform in a horizontal direction, and wherein said linear motion of said buoyant platform is converted from kinetic energy received by said buoyant platform into electrical energy generated by said plurality of WEC units.

7. The energy conversion system for ocean surface waves as claimed in claim 1, wherein said linear motion of said buoyant platform is created by incoming ocean waves that are moving said buoyant platform in a vertical direction, and wherein said linear motion of said buoyant platform is converted from kinetic energy received by said buoyant platform into electrical energy generated by said plurality of WEC units.

8. The energy conversion system for ocean surface waves as claimed in claim 1, wherein said linear motion of said buoyant platform is created by incoming ocean waves that are swaying said buoyant platform back and forth in an oscillatory manner, and wherein said linear motion of said buoyant platform is converted from kinetic energy received by said buoyant platform into electrical energy generated by said plurality of WEC units.

9. The energy conversion system for ocean surface waves as claimed in claim 1 comprises:
   each of said plurality of WEC units further comprises a first one-way clutch; and
   said first one-way clutch being torsionally integrated between said pinion and said transmission.

10. The energy conversion system for ocean surface waves as claimed in claim 9 comprises:
    each of said plurality of WEC units further comprises a second one-way clutch; and
    said second one-way clutch being torsionally integrated between said transmission and said generator.

11. The energy conversion system for ocean surface waves as claimed in claim 1 comprises:
    said rotational energy storage mechanism comprises a flywheel; and
    said flywheel being torsionally connected to said generator.

12. The energy conversion system for ocean surface waves as claimed in claim 1 comprises:
    said pinion being torsionally connected to said input shaft; and
    said output shaft being torsionally connected into said transmission.

13. The energy conversion system for ocean surface waves as claimed in claim 1 comprises:
    said transmission being torsionally connected to said input shaft; and
    said output shaft being torsionally connected into said generator.

14. The energy conversion system for ocean surface waves as claimed in claim 1 comprises:
    each of the plurality of WEC units further comprises a stopper and a choke;
    said stopper being integrated along the cable;
    said choke being connected onto said cam mechanism around said cable; and
    said choke being positioned along said cable in between said anchor and said stopper.

15. The energy conversion system for ocean surface waves as claimed in claim 1 comprises:
    said buoyant platform being a circular disk shape; and
    said lever arm for each of said plurality of WEC units being radially positioned around said circular disk shape.

16. The energy conversion system for ocean surface waves as claimed in claim 1 comprises:
    said buoyant platform being a circular disk shape; and
    a boom for each of said plurality of WEC units being radially positioned around said circular disk shape.

17. The energy conversion system for ocean surface waves as claimed in claim 1 comprises:
    said buoyant platform being a rectangular shape; and
    said lever arm for each of said plurality of WEC units being perpendicularly oriented with a respective edge of said rectangular shape.

18. The energy conversion system for ocean surface waves as claimed in claim 1 comprises:
    said buoyant platform being a rectangular shape; and
    a boom for each of said plurality of WEC units being perpendicularly oriented with a respective edge of said rectangular shape.

19. An energy conversion system for ocean surface waves comprises:
    a buoyant platform;
    a plurality of wave-energy capturing (WEC) units;
       each of said plurality of WEC units comprises a cam mechanism, a recoiling mechanism, a cable, an anchor, a pinion, a transmission, a rotational energy storage mechanism, and a generator;
    said plurality of WEC units being peripherally distributed about said buoyant platform;
    said cam mechanism being tethered to said anchor by said cable;
    said cam mechanism being mounted onto said buoyant platform, wherein the cam mechanism is actuated by linear motion of said buoyant platform;
    said recoiling mechanism being operatively coupled to said cam mechanism, wherein said recoiling mechanism recoils said cam mechanism after said cam mechanism is actuated by said linear motion of said buoyant platform;
    said cam mechanism being operatively engaged to said transmission;
    said transmission being operatively connected into said generator;
    said rotational energy storage mechanism comprises an input shaft, an output shaft, a drive spring, and a locking mechanism;
    said input shaft being torsionally fixed to a first end of said drive spring; and
    a second end of said drive spring being torsionally fixed to said output shaft.

20. The energy conversion system for ocean surface waves as claimed in claim 19 comprises:
    said cam mechanism comprises a lever arm and a fulcrum;
    said recoiling mechanism being a tension spring;
    said lever arm comprises a protruding end and a racked gear end; said fulcrum being connected onto said buoyant platform;
    said lever arm being pivotally mounted to said fulcrum between said protruding end and said racked gear end;
    said tension spring being operatively coupled to said racked gear end, wherein said tension spring recoils said racked gear end towards said buoyant platform;
    said anchor being tethered to said protruding end by said cable; and
    said racked gear end being engaged to said pinion.

21. The energy conversion system for ocean surface waves as claimed in claim 20 comprises:
    each of said plurality of WEC units further comprises an tension/slack generating mechanism;
    said tension/slack generating mechanism comprises a bracket, a connecting rod, a length adjusting spring, and a locking spring;
    said bracket comprises a clamping end and an actuation end;
    said cable traversing about said protruding end and along a top surface of said lever arm;
    said cable being tethered to said lever arm by said length adjusting spring;
    said clamping end being positioned around said cable and said top surface;

said bracket being pivotally mounted to said lever arm in between said clamping end and said actuation end;
said actuation end being tethered to said lever arm by said locking spring;
said actuation end being slidably engaged along a railed end of said connecting rod; and
a fixed end of said connecting rod being pivotally connected to said fulcrum.

22. The energy conversion system for ocean surface waves as claimed in claim 21 comprises:
wherein said lever arm and said buoyant platform are oriented at a functional angle range between each other; and
said cable being pressed against said top surface by said clamping end.

23. The energy conversion system for ocean surface waves as claimed in claim 21, wherein said clamping end being offset from said cable and said top surface.

24. The energy conversion system for ocean surface waves as claimed in claim 19 comprises:
said cam mechanism comprises a boom, a pulley, a spool, and a drive gear;
the recoiling mechanism being a torsion spring;
said boom comprises an outer end and an inner end;
said inner end being mounted onto said buoyant platform;
said spool being rotatably mounted onto said buoyant platform, adjacent to said inner end;
said pulley being rotatably mounted to said outer end;
said cable traversing from said anchor, about said pulley, and to said spool;
said spool being axially connected to said drive gear;
said drive gear being engaged to said pinion; and
said spool being axially connected to said torsion spring.

25. The energy conversion system for ocean surface waves as claimed in claim 19, wherein said anchor for each of said WEC units is lodged into a seabed.

26. The energy conversion system for ocean surface waves as claimed in claim 19, wherein said linear motion of said buoyant platform is created by incoming ocean waves that are moving said buoyant platform in a horizontal direction, and wherein said linear motion of said buoyant platform is converted from kinetic energy received by said buoyant platform into electrical energy generated by said plurality of WEC units.

27. The energy conversion system for ocean surface waves as claimed in claim 19, wherein said linear motion of said buoyant platform is created by incoming ocean waves that are moving said buoyant platform in a vertical direction, and wherein said linear motion of said buoyant platform is converted from kinetic energy received by said buoyant platform into electrical energy generated by said plurality of WEC units.

28. The energy conversion system for ocean surface waves as claimed in claim 19, wherein said linear motion of said buoyant platform is created by incoming ocean waves that are swaying said buoyant platform back and forth in an oscillatory manner, and wherein said linear motion of said buoyant platform is converted from kinetic energy received by said buoyant platform into electrical energy generated by said plurality of WEC units.

29. The energy conversion system for ocean surface waves as claimed in claim 19 comprises:
each of said plurality of WEC units further comprises a first one-way clutch; and
said first one-way clutch being torsionally integrated between said pinion and said transmission.

30. The energy conversion system for ocean surface waves as claimed in claim 29 comprises:
each of said plurality of WEC units further comprises a second one-way clutch; and
said second one-way clutch being torsionally integrated between said transmission and said generator.

31. The energy conversion system for ocean surface waves as claimed in claim 19 comprises:
said rotational energy storage mechanism comprises a flywheel; and
said flywheel being torsionally connected to said generator.

32. The energy conversion system for ocean surface waves as claimed in claim 19 comprises:
said pinion being torsionally connected to said input shaft; and
said output shaft being torsionally connected into said transmission.

33. The energy conversion system for ocean surface waves as claimed in claim 19 comprises:
said transmission being torsionally connected to said input shaft; and
said output shaft being torsionally connected into said generator.

34. The energy conversion system for ocean surface waves as claimed in claim 19 comprises:
each of the plurality of WEC units further comprises a stopper and a choke;
said stopper being integrated along the cable;
said choke being connected onto said cam mechanism around said cable; and
said choke being positioned along said cable in between said anchor and said stopper.

35. The energy conversion system for ocean surface waves as claimed in claim 19 comprises:
said buoyant platform being a circular disk shape; and
a lever arm for each of said plurality of WEC units being radially positioned around said circular disk shape.

36. The energy conversion system for ocean surface waves as claimed in claim 19 comprises:
said buoyant platform being a circular disk shape; and
a boom for each of said plurality of WEC units being radially positioned around said circular disk shape.

37. The energy conversion system for ocean surface waves as claimed in claim 19 comprises:
said buoyant platform being a rectangular shape; and
a lever arm for each of said plurality of WEC units being perpendicularly oriented with a respective edge of said rectangular shape.

38. The energy conversion system for ocean surface waves as claimed in claim 19 comprises:
said buoyant platform being a rectangular shape; and
a boom for each of said plurality of WEC units being perpendicularly oriented with a respective edge of said rectangular shape.

* * * * *